United States Patent Office 3,426,700
Patented Feb. 11, 1969

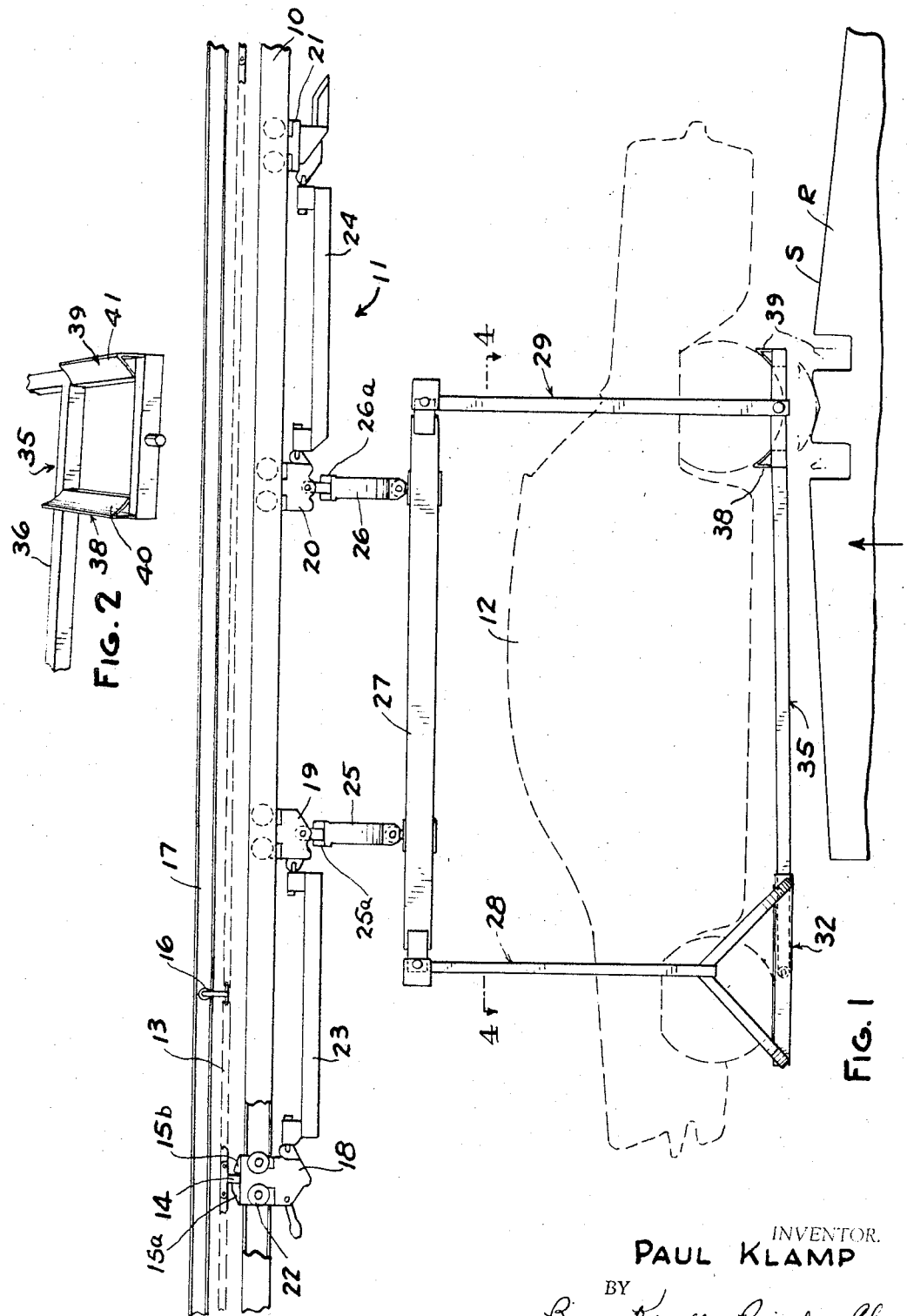

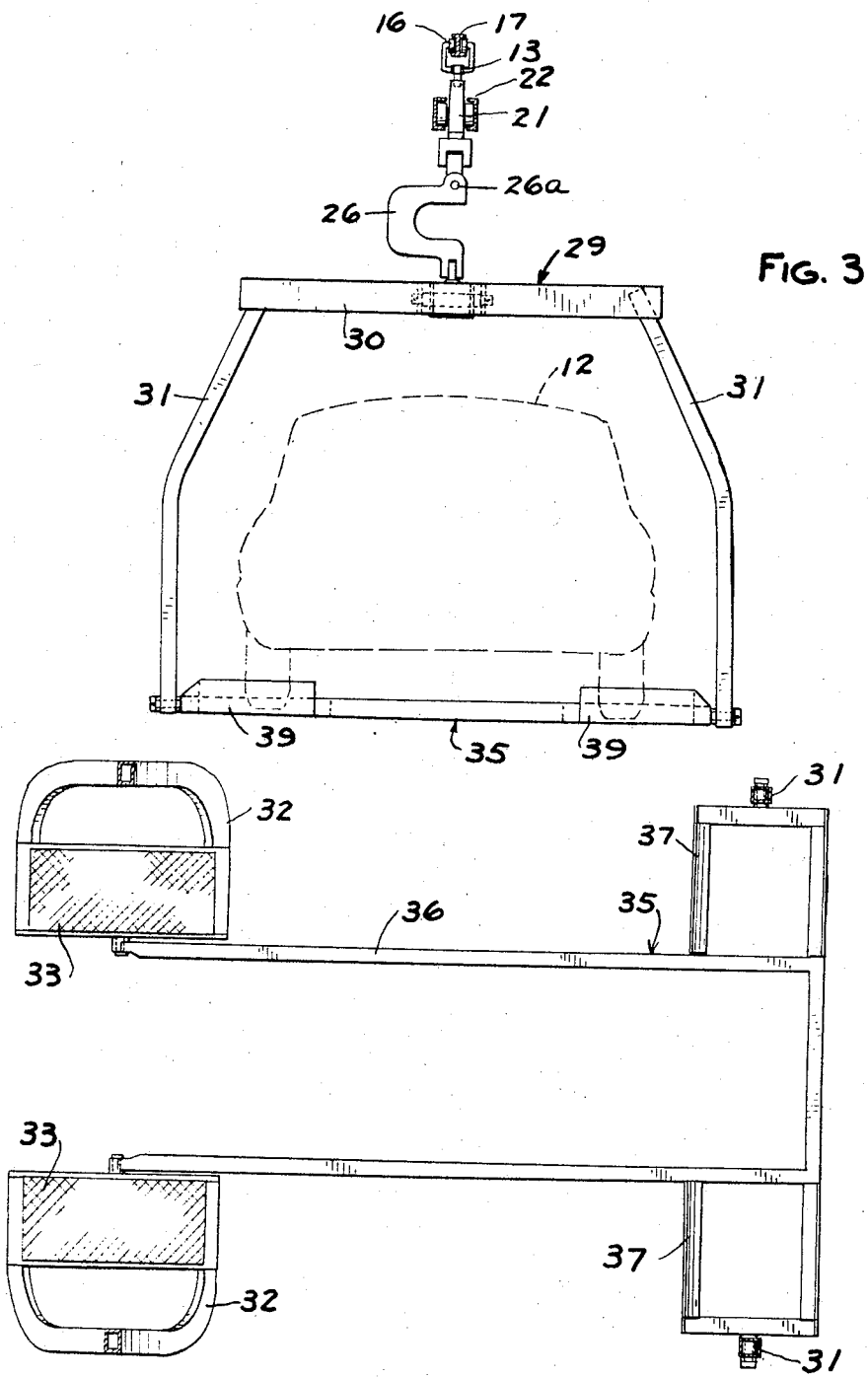

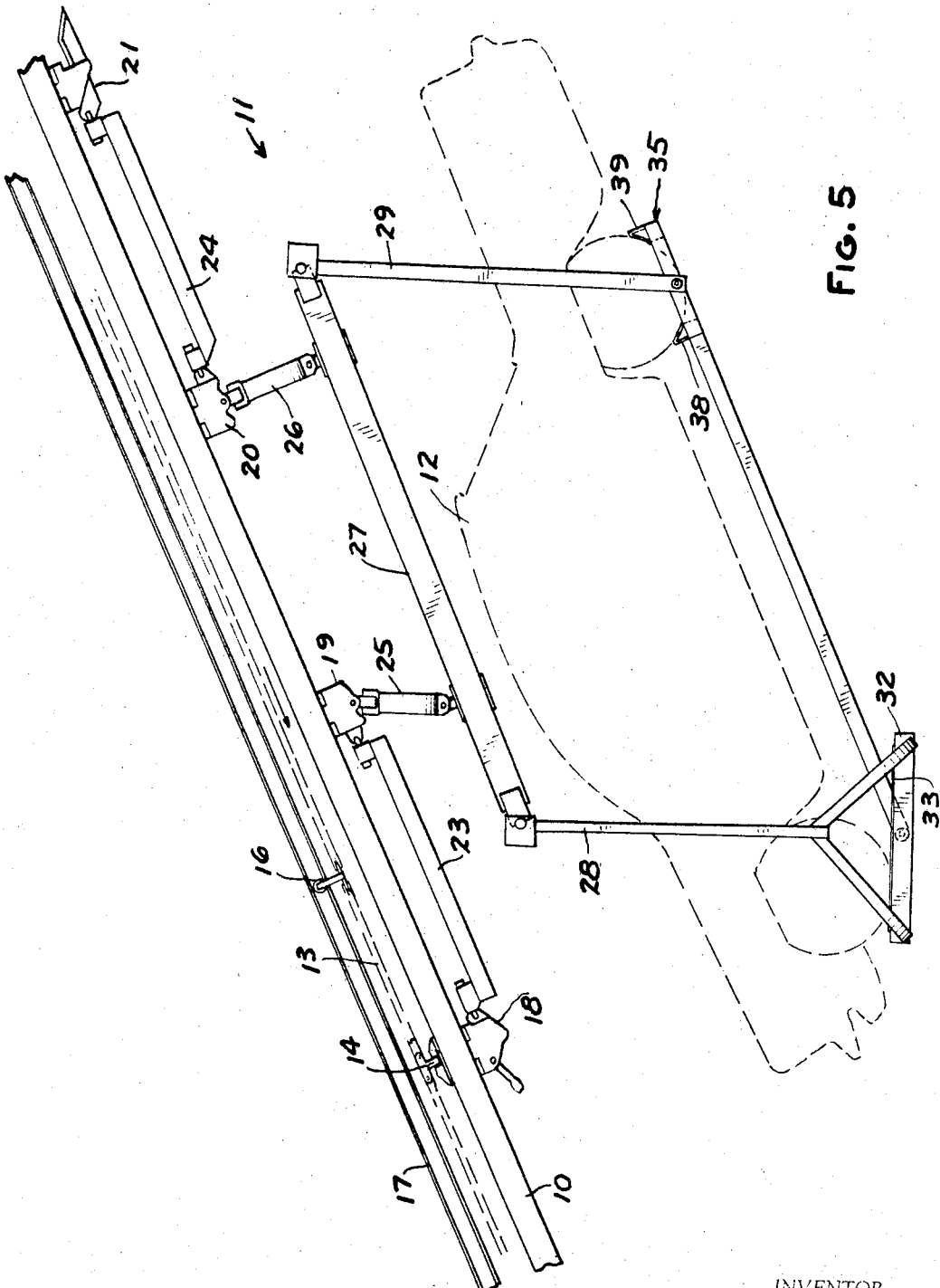

3,426,700
CARRIER FOR POWER AND FREE CONVEYOR SYSTEMS
Paul Klamp, St. Clair Shores, Mich., assignor to Mechanical Handling Systems, Inc., Warren, Mich., a corporation of Michigan
Filed Nov. 22, 1966, Ser. No. 596,302
U.S. Cl. 104—94                     8 Claims
Int. Cl. B61b 3/00, 9/00; E01b 25/22

ABSTRACT OF THE DISCLOSURE

A power and free conveyor system for carrying automobiles and similar vehicles comprising a carrier movable along a track. The carrier has first and second longitudinally spaced downwardly extending hangers thereon. A first support is fixed to the first hanger and has horizontal wheel engaging surfaces thereon and a second support is pivoted to the second hanger and to the first support and has wheel engaging surfaces thereon.

---

This invention relates to power and free conveyor systems and particularly to a carrier for power and free conveyor systems for carrying automobiles and similar vehicles.

In previously built carriers, the supports for the wheels of the car always hang in a horizontal position, with the front wheels resting on flat surfaces (as in the present invention) and each rear wheel resting on two spaced, extended rollers which leave their axes parallel of those of the car wheels. The spread of each pair of rollers allows the car wheel to nest between the rollers. The rollers must be free to turn where the conveyor run changes from an inclined to a straight section and vice versa, because the car body assumes relative angular positions to the nesting rollers, and the car wheels are sometimes locked. During this relative motion the underside of the car frame and the exhaust move toward one or the other of the nesting rollers and interfere if the rollers are spaced well apart. On inclines, the resulting shallow nesting of the rear wheels on rollers which are free to turn constitutes a hazard during starts and stops of the conveyor, and accidents have occurred.

Among the objects of the invention are to provide a simple, efficient, safe and relatively inexpensive carrier for supporting an automobile or similar vehicle for movement along a power and free conveyor; wherein the rear wheel supports remain parallel to the underside of the automobile, even on conveyor inclines, whereas the front wheel supports remain substantially parallel to the floor; wherein because there is no relative turning between the rear wheel supports and the car body, so that the initial clearance between the under-structure of the car and the rear wheel supports remains the same, and therefore the rear wheel supports can be much further apart than the rollers of the prior art construction and thereby provide a deep well and much greater safety, especially in view of the fact that they do not revolve like rollers; which will support an automobile or similar vehicle in a manner to permit ready access to the automobile for assembly and performance of work thereon while it is moved along the conveyor; which will effectively hold the automobile at various inclinations of the conveyor; which will accommodate automobiles of varying length and wheel base and which requires minimum maintenance.

Basically these requirements of keeping the rear wheel supports parallel to the underside of the car body and the front wheel supports parallel to the floor are met by a novel arrangement of the hinge points of the suspension system, wherein the rear wheel supports are rigidly extended all the way to the front wheel supports and hinged to the latter underneath their suspension point.

In the drawings:

FIG. 1 is a fragmentary side elevational view of a power and free conveyor system embodying the invention.

FIG. 2 is a fragmentary perspective view of a portion of the carrier shown in FIG. 1.

FIG. 3 is a rear elevational view of the carrier shown in FIG. 1.

FIG. 4 is a fragmentary sectional view taken along the line 4—4 in FIG. 1.

FIG. 5 is a fragmentary side elevational view of the power and free conveyor system at another portion along its length.

Referring to FIG. 1, the invention relates to a power and free conveyor system which comprises a track 10 along which carriers 11 that support vehicles such as automobiles 12 are moved by a conveyor 13 that has pushers 14 thereon adapted to engage pusher dog 15a to push the carrier along the track 10 and hold-back dog 15b to keep the carrier from moving ahead of pusher 14, particularly on descending parts of track 10 (FIG. 5). The conveyor 13 comprises a chain that is supported by trolleys 16 along a conveyor track 17.

As shown in FIG. 1, the carrier 11 comprises two pairs of trolleys 18, 19 and 20, 21, respectively, that are supported by rollers 22 for movement along the track 10. Trolleys 18, 19 are interconnected by a tie bar 23 that is pivoted to each of the trolleys for both horizontal and vertical movement. Trolleys 20, 21 are similarly interconnected by a tie bar 24. Vertically extending hanger bars 25, 26 are pivoted at their upper ends to trolleys 19, 20, respectively, and are swivelled at their lower ends to a longitudinally extending bar 27 for movement about a horizontal axis and also about a transverse axis extending vertically through the bar 27 when the bar 27 is horizontal. Hangers 25, 26 are U-shaped in cross section (FIG. 3) with the legs of the U extending horizontally to provide clearance for a drip pan (not shown) to prevent contaminants from falling from the conveyor onto the vehicle. The drip pan is fixed in position below the track throughout the length of the track. Hangers 25 and 26 are provided with a swivel connection 25a and 26a, respectively, the axes of their swivel connections being parallel to the conveyor track (FIG. 3). This arrangement allows free side-swing of the carrier, without cramping the trolley wheels 22 inside track 10. Such side-swing of the carrier occurs, for instance, when a person enters the vehicle, as well as due to swaying on conveyor turns, or where a working man applies side pressure to the vehicle, etc. Hangers 28, 29 are pivoted to the front and rear of the bar 27, respectively. Each of the hangers 28, 29 comprises a transverse bar or member 30 and rigid downwardly extending arm 31 (FIG. 3).

Wheel supports 32 are fixed to the lower ends of the arms 31 of the front hanger 28 and each support 32 includes a horizontal wheel engaging surface 33. A second support 35 is pivoted to the supports 32 and to the lower ends of the arms 31 of the hanger 29. Specifically, second support 35 comprises longitudinally extending members 36 that are pivoted at one end to the supports 32 and rectangular frame portions 37 at the other end which are pivoted to the arms 31 of the rear hanger 29. As shown in FIG. 2, brackets 38, 39 are provided on the longitudinally spaced members of the frame 37 to define an upwardly and forwardly inclined surface 40 and an upwardly and rearwardly inclined surface 41. The surfaces 40, 41 combine to form a wheel receiving depression.

In order to load the carrier, it is temporarily stopped from moving along the conveyor track, and a lifting ramp R (FIG. 1) is elevated into position to provide a surface S along which the vehicle 12 can be driven or pushed to guide the wheels of the vehicle onto position to bring the front wheels into the surfaces 33 and the rear wheels in position so that when the ramp R is lowered, the rear wheels will be received in the depressions formed by the surfaces 40, 41. As the carrier is then moved along the track 10 by the chain 13, the surfaces 33 will remain horizontal while inclination of the second support 35 will vary as the inclination of the track varies.

At the point of the conveyor system where the carriers are unloaded, a second lifting ramp R is provided which is lifted after the carrier with vehicle has come to a momentary stop, so that now the vehicle may be driven off the carrier.

Thus, as shown in FIG. 5, if the track dips downwardly, the rear wheels of the vehicle will be retained in the rear support 35 while the front wheels will roll along the surfaces 33 of the front supports 32. The vertical extent of the brackets 38, 39 is sufficient to insure that the vehicle will not ride out of the depressions and at the same time, the brackets will not engage any portions of the undercarriage of the vehicle. Since the rear support 35 remains parallel to the axis of the vehicle and does not change its angular relation thereto, there is no relative rotation between the rear wheels and the brackets 38, 39.

In addition to accommodating for variations and inclination of the track, the carrier embodying the invention permits vehicles of varying length and wheel base to be carried since the front wheel of the vehicle can move along the surfaces 33 to varying extents depending upon the length of the automobile.

Although the invention has been described as preferably having the front wheels engaging the front supports, the invention is also applicable to an arrangement wherein the front wheels engage the rear supports.

I claim:
1. For use in a power and free conveyor system for carrying automobiles and similar vehicles having front and rear wheels, the combination comprising
   a carrier adapted to be moved along a track,
   first and second longitudinally spaced downwardly extending hangers on said carrier,
   a first support fixed to said first hanger and having a substantially horizontal wheel engaging surface thereon which remains substantially horizontal in all inclinations of the carrier,
   a second support pivoted to said second hanger and to said first support whereby the inclination of said second support varies as the inclination of the track varies,
   and wheel engaging surfaces on said second support defining a wheel receiving depression on said second support,
   whereby one of said front and rear wheels of a vehicle is received in said depression and remains therein throughout all inclinations of the track while the other of said front and rear wheels of the vehicle rests on said first support and moves longitudinally thereof as the inclination of the track varies.

2. The combination set forth in claim 1 wherein each of said hangers comprises a transversely extending cross portion and arms extending downwardly from the ends of said cross portion.

3. The combination set forth in claim 2 wherein said first support comprises a rigid member fixed to the lower end of each said arm.

4. The combination set forth in claim 3 wherein said second support comprises a pair of longitudinally extending members having their forward ends pivoted to said first supports and a pair of rigid frame members fixed to their rear ends,
   said frame members including said wheel engaging surfaces.

5. For use in a power free conveyor system for carrying automobiles and similar vehicles having front and rear wheels, the combination comprising
   a free trolley carrier comprising two pairs of trolleys adapted to be moved along a track,
   tie bar means pivotally interconnecting each pair of said trolleys,
   supporting bars pivotally interconnected to one of each of the trolleys of a pair,
   a longitudinally extending bar pivoted to the lower ends of said support bars,
   first and second longitudinally spaced hangers pivoted to said longitudinally extending bar,
   a first support fixed to said first hanger and having substantially horizontal wheel engaging surfaces thereon which remain substantially horizontal in all inclinations of the trolleys of the carrier as the trolleys move along a track,
   a second support pivoted to the lower ends of said second hanger at one end and to said first mentioned support at the other end whereby the inclination of said second support varies as the inclination of the track varies,
   and wheel engaging surfaces on said second support inclined upwardly and forwardly and upwardly and rearwardly to define wheel receiving depressions on said second support,
   whereby one of said front and rear wheels of a vehicle is received in said depressions and remains there throughout all movements of said carrier while the other of said front and rear wheels of said vehicle rest on said first mentioned support and move longitudinally thereon as the inclination of the track varies.

6. The combination set forth in claim 5 wherein each of said hangers comprises a transversely extending cross portion and arms extending downwardly from the ends of said cross portion.

7. The combination set forth in claim 6 wherein said first support comprises a rigid member fixed to the lower end of each said arm.

8. The combination set forth in claim 7 wherein said second support comprises a pair of longitudinally extending members having their forward ends pivoted to said rigid members and a pair of rigid frame members fixed to the rear ends of said longitudinally extending members,
   said frame members including said wheel engaging surfaces.

References Cited
UNITED STATES PATENTS 3,115,846    12/1963    Dehne _____ 104—172 X
3,314,378    4/1967    Potter _____ 104—172 X ARTHUR L. LA POINT, *Primary Examiner.*

DANIEL F. WORTH, *Assistant Examiner.*

U.S. Cl. X.R.
104—172